United States Patent [19]

Searle et al.

[11] Patent Number: 5,041,315

[45] Date of Patent: Aug. 20, 1991

[54] FLEXIBLE CERAMIC MEMBER AND METHOD OF PRODUCTION THEREOF

[75] Inventors: Ralph Searle, Solon, Ohio; Hans Leistner, Ingelheim; Raimund Brückner, Engenhahn, both of Fed. Rep. of Germany; Ibrahim Mentesh, South Euclid, Ohio; Edward Levadnuk, Raleigh, N.C.

[73] Assignee: Zircoa Inc., Solon, Ohio

[21] Appl. No.: 353,323

[22] Filed: May 15, 1989

[51] Int. Cl.⁵ .............................. F16F 1/02; F16L 9/00
[52] U.S. Cl. .................................. 428/34.4; 138/177;
  264/299; 264/340; 428/156; 428/167; 428/400;
  267/166
[58] Field of Search ............... 428/34.4, 34.6, 156,
  428/167, 400; 264/299, 340; 138/177; 267/166

[56] References Cited

U.S. PATENT DOCUMENTS

| | | | |
|---|---|---|---|
| 3,944,784 | 3/1976 | Petterec et al. | 219/216 |
| 4,734,963 | 4/1988 | Ishiyama | 29/25.35 |
| 4,735,638 | 4/1988 | Ciliberti et al. | 55/302 |
| 4,871,515 | 10/1989 | Reichle et al. | 55/131 |

Primary Examiner—James J. Seidleck
Attorney, Agent, or Firm—Wenderoth, Lind & Ponack

[57] ABSTRACT

A flexible member capable of withstanding a high temperature environment and/or a corrosive atmosphere or media is formed of a component in a desired shape and of a ceramic material having a modulus of elasticity of 150,000 to 200,000 MPa and a flexural strength of more than 400 MPa. The component is provided with at least one reduced thickness portion to impart to the component a desired degree of flexibility and/or elasticity.

67 Claims, 2 Drawing Sheets

FLEXIBLE CERAMIC MEMBER AND METHOD OF PRODUCTION THEREOF

BACKGROUND OF THE INVENTION

The present invention relates to a flexible ceramic member and a method of production thereof, the flexible ceramic member having the capability of withstanding high temperature and/or corrosive atmospheres or media.

Ceramic members have been employed in the prior art for use only as rigid elements having no characteristic elastic or flexible properties. Such ceramic members, normally formed of oxide ceramic materials, particularly partially or fully stabilized zirconium oxide, are capable of use in high temperature environments, for example above 1000° C. and/or in corrosive environments. Such ceramic members withstand such environments or atmospheres and show considerably less wear than would metal elements.

However, when it has been necessary to employ flexible members, such as springs, bellows or flexible shafts, it has been necessary to form such members of metal to provide the necessary characteristics of flexibility and elasticity. Such metal members however are not properly suited for use in a high temperature environment and/or in a corrosive atmosphere or media, since metal materials do not easily withstand such environments or atmospheres and are subject to substantial wear under such conditions.

SUMMARY OF THE INVENTION

With the above discussion in mind, it is an object of the present invention to provide a flexible member that is formed of a material and in a manner such that the flexible member is capable of withstanding a high temperature environment and/or a corrosive atmosphere or media. It is a further object of the present invention to provide a method of production of such a flexible member.

These objects are achieved in accordance with the present invention by the provision that the flexible member includes a component in a desired shape and formed of a ceramic material, particularly an oxide ceramic material, and further particularly partially or fully stabilized zirconium oxide, having a modulus of elasticity of 150,000 to 200,000 MPa, preferably 170,000 to 180,000 MPa, and a flexural strength of more than 400 MPa, preferably 1,000 to 1,400 MPa. This component formed of a ceramic material has imparted thereto a desired degree of flexibility, this being achieved by providing the component with at least one reduced thickness portion. As a result, it is possible to form a member, such as a spring, a bellows or a flexible shaft, with a degree of flexibility necessary for various uses, while ensuring that the flexible member is capable of withstanding a high temperature environment and/or a corrosive atmosphere or media. Thus, the flexible member according to the present invention can be exposed to high temperatures, for example above 1000° C., and corrosive atmospheres without deterioration or loss of shape. It surprisingly has been found that a member formed of a ceramic material in accordance with the present invention, provided in the shape of a spring, a bellows or a flexible shaft, has desired degree of flexibility and elasticity necessary for use as such members.

The ceramic material is used to form a component of a desired shape, for example a tube, a rod or a disc-shaped molded part, such molded part being completely fired. The component is provided with at least one reduced thickness portion, thereby forming at least one weak spot or area in the component to impart thereto a desired degree of pliability or flexibility. The at least one reduced thickness portion may be formed during the molding of the component, or alternatively can be formed in the molded part, for example by means of cutting, sawing or milling, etc.

The components can be of various desired shapes, dependent upon the shapes of the members to be formed, and the reduced thickness portions can be provided to impart a final shape to the member, depending upon such desired shape and the required degree and direction or manner of flexibility and/or elasticity thereof. The ceramic materials employed can be varied depending upon the intended application of the member, as would be understood by one skilled in the art.

BRIEF DESCRIPTION OF THE DRAWINGS

Other objects, features and advantages of the present invention will be apparent from the following detailed description of various embodiments thereof, with reference to the accompanying drawings, wherein.

DETAILED DESCRIPTION OF THE INVENTION

Figure 1:
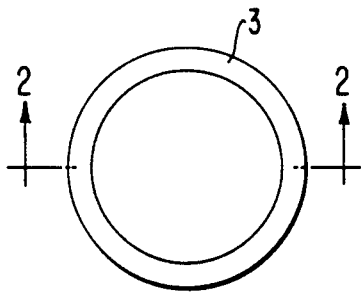
FIG. 1 is an end view taken along line 1—1 of FIG. 2, of a helical or spiral spring formed from a tubular ceramic molded component.

The starting components for the members illustrated in the drawings are variously configured completely fired molded parts of ceramic material, preferably oxide ceramic material, and particularly partially or fully stabilized zirconium oxide. The ceramic material has a modulus of elasticity of 150,000 to 200,000 MPa, preferably 170,000 to 180,000 MPa. The flexural strength of the fully fired ceramic material is more than 400 MPa, preferably 1,000 to 1,400 MPa.

To provide such fully fired and molded part of such ceramic material with desired flexibility and/or elasticity, the molded component is provided with at least one reduced thickness portion, to be described in more detail below. Such reduced thickness portion or portions may be formed by various mechanical operations, such as cutting, sawing or milling, or may be provided in the components during the molding thereof. The position, size and number of the reduced thickness portions are selected according to the desired degree of flexibility and/or elasticity to be imparted to the particular member.

A preferable ceramic material is a partially or fully stabilized zirconium oxide (ZrO$_2$) By stabilizing the zirconium oxide it is possible to reduce the brittleness or shrinkage thereof at a temperature above 1000° C. For stabilization of the zirconium oxide it is possible to employ magnesium, calcium, or particularly yttrium, or mixtures thereof, wherein the quantity of the additive is generally below approximately 1 to 3% by weight. One skilled in the art readily would understand the properties to be imparted to the zirconium oxide by such additives to develop partially or fully stabilized zirconium oxide compositions.

Figure 2:
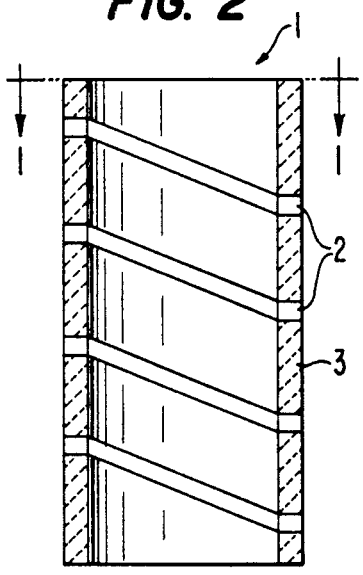
FIG. 2 is a longitudinal cross-sectional view taken along line 2—2 of FIG. 1.

In FIGS. 1 and 2 is illustrated a flexible helical or spiral spring 1 formed from a tube-shaped molded part 3 by providing therein a single continuous spiral reduced thickness portion in the form of a cut or incision 2 that extends entirely through the thickness of the wall of the tubular part 3. The single spiral cut 2 forms a continuous spiral ceramic element 1 that can be used as a flexible helical spring. Due to the formation of such member of the above discussed materials, such member can be used in a high temperature environment and/or a corrosive atmosphere or media. It of course would be possible to form plural spiral cuts in a tubular member to thereby form plural spiral flexible ceramic springs. The spiral cut 2 may be formed during the molding of the ceramic component, or alternatively can be formed after the molding and/or firing thereof by a suitable mechanical operation, for example cutting or milling.

Figure 4:
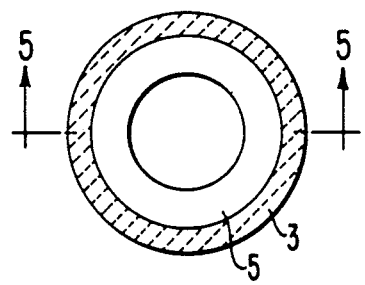
FIG. 4 is a similar view but taken along line 4—4 of FIG. 5.
Figure 5:
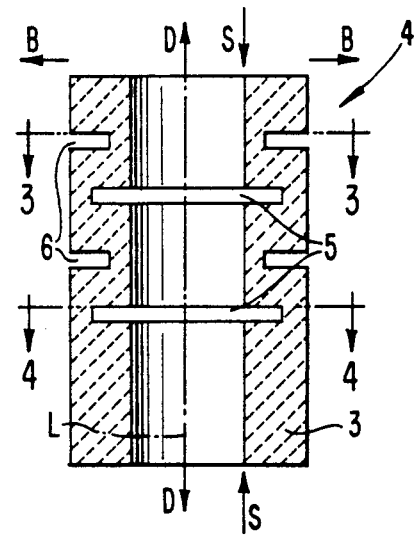
FIG. 5 is a longitudinal cross-sectional view taken along lines 5—5 in FIGS. 3 and 4.
Figure 3:
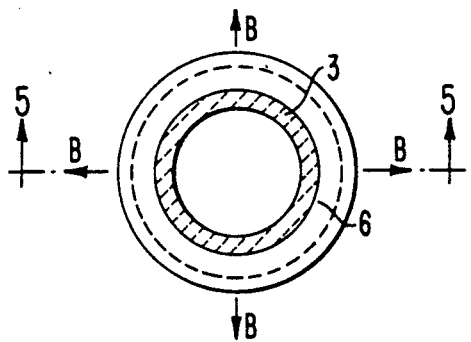
FIG. 3 is a cross-sectional view taken along line 3—3 of FIG. 5 of a bellows formed from a tubular ceramic molded component.

FIGS. 3-5 illustrate the formation of a flexible bellows member 4 from a tubular molded part or component 3. Inner and outer surfaces of the tubular component 3 have formed therein alternate annular grooves 5, 6, respectively. Grooves 5, 6 extend through a portion only of the thickness of the tubular component 3. The grooves 5, 6 alternate in the direction of the longitudinal axis L of the bellows 4. The grooves 5, 6 are sized and located such that the remaining part of the tubular component 3 forms the bellows 4 with a desired degree of flexibility and elasticity in the direction of arrows D and a desired degree of crushability and elasticity in the direction of arrows S, as well as a desired degree of flexibility in directions B perpendicular to the longitudinal axis L.

The tubular helical spring 1 of FIGS. 1 and 2 and the bellows 4 of FIGS. 3-5 are suitable for the transmission of torsional forces. Furthermore, it is not necessary for the incision 2 or the annular grooves 5, 6 to be provided along the entire longitudinal length of the tubular components 3. It is possible to have suitably sized end portions or segments that are free of such reduced thickness portions, for example for use in clamping the components into or onto other elements such as holders or supports.

Figure 6:
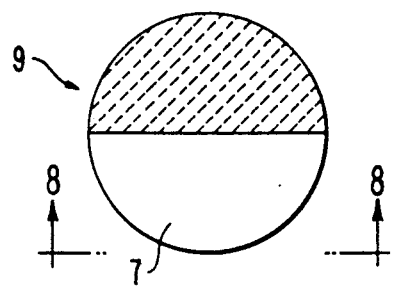
FIG. 6 is a cross-sectional view taken along 6—6 of FIG. 8 and illustrating a flexible shaft formed from a rod-shaped ceramic molded component.
Figure 7:
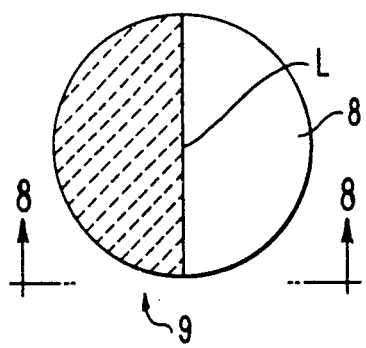
FIG. 7 is a similar view but taken along line 7—7 of FIG. 8.
Figure 8:
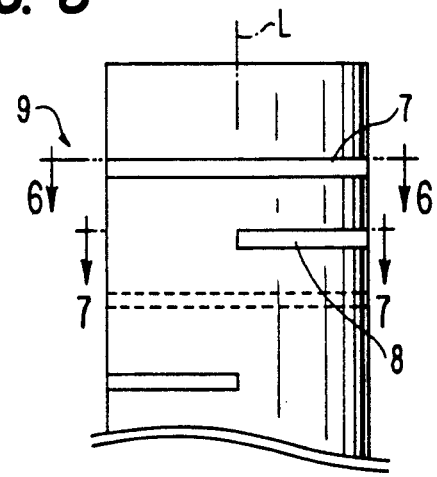
FIG. 8 is an elevation view taken along line 8—8 of FIGS. 6 and 7.

In the embodiment of FIGS. 6-8 the starting component is a solid rod-shaped molded part. Along the length of such rod are provided a plurality of reduced thickness portions in the form of slots 7, 8, such that the result is a flexible shaft 9. In the illustrated arrangement the slots 7, 8 are diametral and extend to a longitudinal axis L of the rod. Thus, each slot extends over 180°. Subsequent or adjacent of the slots are offset by 90° around the longitudinal axis L. It of course would be possible to make the slots deeper or less deep and/or to offset them from each other by an angle of more or less than 90°. In this embodiment it also is possible to provide that the end portions or segments of the flexible shaft may be maintained free of the slots. Such end portions then can be used for clamping or other manner of mounting of the flexible shaft 9.

In the embodiments according to FIGS. 3-8, the annular grooves 5, 6 and the slots 7, 8 each extend in their respective largest dimensions in directions perpendicular to the longitudinal axes L. In the embodiment of FIGS. 1 and 2, on the other hand, the spiral slit 2 is inclined over the entire length thereof to the longitudinal axis. It also would be possible, if desired, to arrange the various reduced thickness portions to extend parallel, over the entire length thereof or over portions of the length thereof, to the longitudinal axis. This produces a certain degree of elasticity in the case of transfer of a rotational moment, i.e. torque, around the longitudinal axis.

Figure 9:
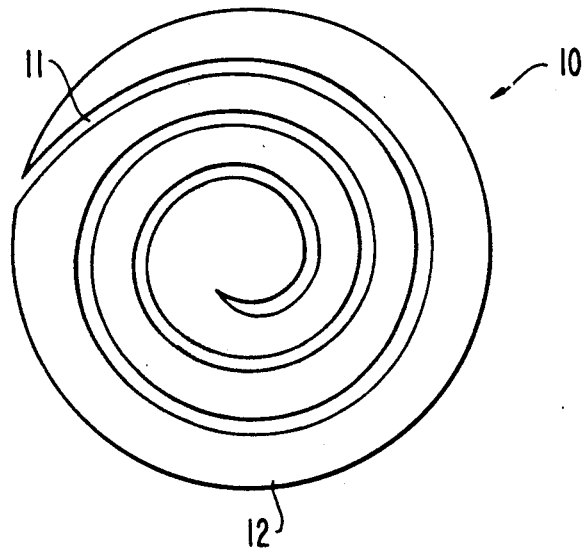
FIG. 9 is a plan view of a flat spiral spring formed from a disc-shaped component.

FIG. 9 illustrates an embodiment wherein a flat molded disc-shaped component 12 has formed therein a continuous spiral slit 11, thereby forming a flat spiral spring member.

Although the present invention has been described and illustrated with respect to preferred features thereof, it is to be understood that various changes and modifications may be made to the specifically described and illustrated features without departing from the scope of the present invention.

We claim:

1. A flexible bellows member capable of withstanding a high temperature and/or corrosive atmosphere or media, said member comprising:
   a single-piece bellows component formed in a desired shape of a ceramic material having a modulus of elasticity of 150,000 to 200,000 MPa and a flexural strength of more than 400 MPa; and
   said bellows having formed therein at least one reduced thickness portion imparting flexibility to said component.

2. A member as claimed in claim 1, wherein said ceramic material is an oxide ceramic material.

3. A member as claimed in claim 2, wherein said oxide ceramic material comprises partially or fully stabilized zirconium oxide.

4. A member as claimed in claim 1, wherein said modulus of elasticity is 170,000 to 180,000 MPa.

5. A member as claimed in claim 1, wherein said flexural strength is 1,000 to 1,400 MPa.

6. A member as claimed in claim 1, wherein said ceramic material of said component is fired.

7. A member as claimed in claim 1, wherein said bellows component is in the form of a tube.

8. A member as claimed in claim 7, wherein said at least one reduced thickness portion comprises a plurality of annular grooves formed in said tube and extending through a portion of the thickness of the wall thereof.

9. A member as claimed in claim 8, wherein said grooves are formed in both inner and outer surfaces of said wall of said tube.

10. A member as claimed in claim 9, wherein said grooves are formed alternately in said inner and outer surfaces.

11. A member as claimed in claim 7, wherein at least one end portion of said tube is free of said reduced thickness portion.

12. A member as claimed in claim 6, wherein said ceramic material of said component is fully fired.

13. A method of producing a flexible bellows member capable of withstanding a high temperature and/or corrosive atmosphere or media, said method comprising:
   forming a bellows component in a desired shape of a ceramic material having a modulus of elasticity of 150,000 to 200,000 MPa and a flexural strength of more than 400 MPa; and
   imparting to said bellows component a desired degree of flexibility by providing said bellows component with at least one reduced thickness portion.

14. A method as claimed in claim 13, wherein said ceramic material is an oxide ceramic material.

15. A method as claimed in claim 2, wherein said oxide ceramic material comprises partially or fully stabilized zirconium oxide.

16. A method as claimed in claim 13, wherein said modulus of elasticity is 170,000 to 180,000 MPa.

17. A method as claimed in claim 13, wherein said flexural strength is 1,000 to 1,400 MPa.

18. A method as claimed in claim 13, wherein said forming comprises firing said ceramic material of said component.

19. A method as claimed in claim 13, comprising providing said component with said reduced thickness portion during said forming of said bellows component.

20. A method as claimed in claim 13, wherein said providing said reduced thickness portion comprises making at least one incision in said component after said bellows forming thereof.

21. A method as claimed in claim 13, comprising forming said bellows component in the shape of a tube.

22. A method as claimed in claim 21, wherein said at least one reduced thickness portion comprises a plurality of annular grooves formed in said tube and extending through a portion only of the thickness of the wall thereof.

23. A method as claimed in claim 22, wherein said grooves are formed in both inner and outer surfaces of said wall of said tube.

24. A method as claimed in claim 23, wherein said grooves are formed alternately in said inner and outer surfaces.

25. A method as claimed in claim 10, comprising forming maintaining at least one end portion of said tube free of said reduced thickness portion.

26. A method as claimed in claim 18, comprising fully firing said ceramic material of said component.

27. A flexible spiral spring member capable of withstanding a high temperature and/or corrosive atmosphere or media, said member comprising:
   a single-piece spiral spring component formed in a desired shape of a fully or partially stabilized zirconium oxide ceramic material having a modulus of elasticity of 170,000 to 180,000 MPa and a flexural strength of a more than 400 MPa; and
   said spiral spring component having formed therein at least one reduced thickness portion imparting flexibility to said component.

28. A member as claimed in claim 27, wherein said flexural strength is 1,000 to 1,400 MPa.

29. A member as claimed in claim 27, wherein said ceramic material of said component is fired.

30. A member as claimed in claim 29, wherein said ceramic material of said component is fully fired.

31. A member as claimed in claim 27, wherein said spiral spring component is in the form of a tube.

32. A member as claimed in claim 31, wherein said at least one reduced thickness portion comprises a single spiral slit extending entirely through the wall of said tube, whereby said member is in the form of a tubular spiral spring.

33. A member as claimed in claim 31, wherein at least one end portion of said tube is free of said reduced thickness portion.

34. A member as claimed in claim 27, wherein said spiral spring component is in the shape of a flat disc.

35. A member as claimed in claim 34, wherein said at least one reduced thickness portion comprises a single spiral slit extending entirely through said flat disc, whereby said member is in the form of a flat spiral spring.

36. A method of producing a flexible spiral spring member capable of withstanding a high temperature and/or corrosive atmosphere or media, said method comprising:
   forming a spiral spring component in a desired shape of a partially or fully stabilized zirconium oxide ceramic material having a modulus of elasticity of 170,000 to 180,000 MPa and a flexural strength of a more than 400 MPa; and
   imparting to said spiral spring component a desired degree of flexibility by providing said spiral spring component with at least one reduced thickness portion.

37. A method as claimed in claim 36, wherein said flexural strength is 1,000 to 1,400 MPa.

38. A method as claimed in claim 36, wherein said forming comprises firing said ceramic material of said component.

39. A method as claimed in claim 38, comprising fully firing said ceramic material of said component.

40. A method as claimed in claim 36, comprising providing said spiral spring component with said reduced thickness portion during said forming of said spiral spring component.

41. A method as claimed in claim 36, wherein said providing said reduced thickness portion comprises making at least one incision in said spiral spring component after said forming thereof.

42. A method as claimed in claim 36, comprising forming said spiral spring component in the shape of a tube.

43. A method as claimed in claim 42, wherein said at least one reduced thickness portion comprises a single spiral slit extending entirely through the wall of said tube, thereby defining a tubular spiral spring member.

44. A method as claimed in claim 42, comprising maintaining at least one end portion of said tube free of said reduced thickness portion.

45. A method as claimed in claim 36, comprising forming said spiral spring component in the shape of a flat disc.

46. A method as claimed in claim 44, wherein said at least one reduced thickness portion comprises a single spiral slit extending entirely through said flat disc, thereby defining a flat spiral spring member.

47. A flexible shaft member capable of withstanding a high temperature and/or corrosive atmosphere or media, said member comprising:
   a single-piece shaft component formed in the form of a rod of a ceramic material having a modulus of elasticity of 150,000 to 200,000 MPa and a flexural strength of a more than 400 MPa; and said component having formed therein at least one reduced thickness portion imparting flexibility to said component, said at least one reduced thickness portion comprising a plurality of slots formed in said rod from the exterior surface thereof.

48. A member as claimed in claim 47, wherein said ceramic material is an oxide ceramic material.

49. A member as claimed in claim 48, wherein said oxide ceramic material comprises partially or fully stabilized zirconium oxide.

50. A member as claimed in claim 47, wherein said modulus of elasticity is 170,000 to 180,000 MPa.

51. A member as claimed in claim 47, wherein said flexural strength is 1,000 to 1,400 MPa.

52. A member as claimed in claim 47, wherein said ceramic material of said rod is fired.

53. A member as claimed in claim 52, wherein said ceramic material of said rod is fully fired.

54. A member as claimed in claim 47, wherein said plurality of slots are offset from each other about the longitudinal axis of said rod.

55. A member as claimed in claim 47, wherein said slots extend into said rod in directions perpendicular to the longitudinal axis thereof.

56. A member as claimed in claim 47, wherein at least one end portion of said rod is free of said reduced thickness portion.

57. A method of producing a flexible shaft member capable of withstanding a high temperature and/or corrosive atmosphere or media, said method comprising:

forming a shaft component in the form of a rod of a ceramic material having a modulus of elasticity of 150,000 to 200,000 MPa and a flexural strength of a more than 400 MPa; and imparting to said shaft component a desired degree of flexibility by forming in said rod a plurality of reduced thickness portions in the form of slots formed in the exterior surface of said rod.

58. A method as claimed in claim 57, wherein said ceramic material is an oxide ceramic material.

59. A method as claimed in claim 58, wherein said oxide ceramic material comprises partially or fully stabilized zirconium oxide.

60. A method as claimed in claim 57, wherein said modulus of elasticity is 170,000 to 180,000 MPa.

61. A method as claimed in claim 57, wherein said flexural strength is 1,000 to 1,400 MPa.

62. A method as claimed in claim 57, wherein said forming comprises firing said ceramic material of said shaft component.

63. A method as claimed in claim 62, comprising fully firing said ceramic material of said shaft component.

64. A method as claimed in claim 57, comprising providing said shaft component with said reduced thickness portion during said forming of said shaft component.

65. A method as claimed in claim 57, wherein said plurality of slots are offset from each other about the longitudinal axis of said rod.

66. A method as claimed in claim 57, wherein said slots extend into said rod indirections perpendicular to the longitudinal axis thereof.

67. A method as claimed in claim 57, comprising maintaining at least one end portion of said rod free of said reduced thickness portion.

* * * * *